(12) United States Patent
Tsubokawa

(10) Patent No.: US 6,934,466 B2
(45) Date of Patent: Aug. 23, 2005

(54) BUZZ REDUCTION CIRCUIT AND TV/VCR COMBO USING THE SAME

(75) Inventor: Yukio Tsubokawa, Takefu (JP)

(73) Assignee: Orion Electric Co., Ltd., Takefu (JP)

( * ) Notice: Subject to any disclaimer, the term of this patent is extended or adjusted under 35 U.S.C. 154(b) by 517 days.

(21) Appl. No.: 10/233,763

(22) Filed: Sep. 3, 2002

(65) Prior Publication Data

US 2003/0044167 A1 Mar. 6, 2003

(30) Foreign Application Priority Data

Sep. 4, 2001 (JP) .......................................... 2001-266733

(51) Int. Cl.[7] .............................................. H04N 7/64
(52) U.S. Cl. ........................................ 386/113; 386/114
(58) Field of Search ............................... 386/1, 2, 9, 10, 386/12, 21, 39, 40, 47, 48, 51, 76, 93, 96, 100, 113, 114, 115; H04N 7/64

(56) References Cited

U.S. PATENT DOCUMENTS

2001/0026622 A1 * 10/2001 Takahashi et al. ......... 381/71.4

FOREIGN PATENT DOCUMENTS

JP            410234005 A    *  9/1998

* cited by examiner

*Primary Examiner*—Robert Chevalier
(74) *Attorney, Agent, or Firm*—Schulte Roth & Zabel LLP; Joel E. Lutzker; John C. Garces

(57) ABSTRACT

Buzz reduction circuit for eliminating a vertical period buzz without being influenced by amplifier circuits in an audio signal line. A video signal of a VCR video head is input to a vertical synchronizing signal separating circuit to separate a vertical synchronizing signal. A vertical synchronizing pulse is obtained by an integral circuit and a vertical period buzz reduction signal is produced by a vertical period buzz reduction circuit, said vertical period buzz reduction signal having an equal output level and an inverted phase in comparison with the vertical period buzz. The vertical period buzz reduction signal is inputted to a pre-stage of an audio amplifier circuit in an audio output line of a linear audio head to reduce the vertical period buzz included in an output signal of the linear audio head.

10 Claims, 3 Drawing Sheets

(a) output (b) output (c) output (d) output

BUZZ REDUCTION CIRCUIT AND TV/VCR COMBO USING THE SAME

RELATED APPLICATIONS

This application claims priority from Japanese Patent Application No. 2001-266733 filed on Sep. 4, 2001.

BACKGROUND OF THE INVENTION

1. Field of the Invention

The present invention relates to a buzz reduction circuit for eliminating buzz included in a reproduction audio signal of a VCR, and more particularly to a reduction circuit of a vertical period buzz, that is a buzz caused by a magnetic leakage flux of a vertical deflection coil of a television receiver.

2. Description of the Related Art

In the Japanese patent publication No. 10-234005, there is disclosed a method for reducing a vertical period buzz included in a reproduction audio signal of a TV/VCR Combo. FIG. 5 is a block diagram showing a buzz reduction circuit. In an audio output line of a linear audio head 1, there is provided an audio amplifier circuit 2 to amplify a reproduction audio signal from the linear audio head 1 and an audio output amplifier circuit to amplify further the amplified signal. A direct current component is omitted from the output of the audio output amplifier circuit 3 by a capacitor C1, outside noises are omitted by a resistor R1 and a capacitor C2, and finally an audio signal is output under the control of a level of an audio output by a resistor R2.

There is provided a buzz reduction circuit comprising a synchronizing signal separating circuit 4, an integration circuit 5, a phase inversion circuit 6, a waveform shaping circuit 7, and a buzz eliminating circuit 8. An output stage of the buzz eliminating circuit 8 is connected to the rear stage of the audio output amplifier circuit 3. The linear audio head 1 is connected with coils L1 and L2 respectively in series. In order to obtain a reverse phase output that is opposite to a reproduction output from the linear audio head 1 as an output for eliminating a vertical period buzz, the inductances of the respective coil L1 and coil L2 are adjusted suitably and also a mounting angle thereof is adjusted in connection with a deflection coil of a television receiver.

A reproduction video signal from a video head of a VCR is sent to the synchronizing signal separating circuit 4 to separate a synchronizing signal. The vertical synchronizing signal is then extracted in the integration circuit 5, by not letting the horizontal synchronizing signal pass through the integration circuit. The phase of the vertical synchronizing signal is inverted by the phase inversion circuit 6, and the waveform of the signal is shaped by the waveform shaping circuit 7. As a result, a vertical synchronizing pulse is obtained. The buzz eliminating circuit 8 applies the vertical synchronizing pulse only for the vertical synchronizing signal period and reduces a vertical period buzz contained in an audio output from the audio output amplifier circuit 3.

In the above-mentioned conventional technology, the vertical period buzz reduction signal for eliminating a vertical period buzz is inputted to the rear stage of the audio output amplifier circuit 3. However, gain fluctuations of amplifier circuits incorporated in the products influence an audio output, thereby resulting in an uncertainty of buzz elimination. Namely, the buzz component picked up by the linear audio head 1 is amplified by the audio amplifier circuit 2 and the audio output amplifier circuit 3 respectively. As a result, a vibration amplitude of a buzz output from the audio output amplifier circuit 3 becomes larger. When such a vibration amplitude becomes larger, the width of a buzz period portion becomes greater, and as a result, a buzz cannot be eliminated completely by the vertical period buzz reduction circuit.

In order to eliminate variations of a vibration amplitude of buzz to some degree utilizing the coil L1 and the coil L2, it is necessary to adjust the respective coil L1 and coil L2 so that a preferable mounting angle and an inductance are obtained. However, it is troublesome to make adjustments of the coil L1 and the coil L2 in every product, and, furthermore, it reduces production.

In addition, in order to produce a buzz reduction signal to be input to the rear stage of the audio output amplifier circuit 3, it is necessary to shape a waveform of the vertical synchronizing signal. The waveform shaping circuit 7 used for this purpose requires several parts such as an operation amplifier, resulting in an increase in the parts cost and in the production cost.

Instead of the above-mentioned electrical measure, a physical measure can also be adopted to eliminate a vertical period buzz. As shown in FIG. 6, a silicon steel plate 13 used for a magnetic flux shield is inserted between a vertical deflection coil 11 equipped for a CRT 10 of a television receiver and a linear audio head equipped for a VCR 12. Since the silicon steel plate 13 shields a leakage magnetic flux of the vertical deflection coil 11 so as to not jump into a linear audio head, the linear audio head is prevented from picking up a leakage magnetic flux, and thereby a vertical period buzz is eliminated. In this case, however, whenever a layout of the device is changed, it is necessary to review a position and a size of the silicon steel plate. Such review would increase production costs. It should also be noted that a silicon steel plate is a comparatively expensive material. Nevertheless, there is no other substitutive material of low price suitable for eliminating a vertical period buzz.

Where the silicon steel plate is omitted, a vertical period buzz induced by a leakage magnetic flux of a vertical deflection coil equipped for a CRT is output to a linear audio head line. The output vertical period buzz is amplified and finally output as an audio component, so that the S/N ratio deteriorates causing the observer to hear an unpleasant buzzing sound.

SUMMARY OF THE INVENTION

It is therefore an object of the present invention to solve the above problems and to provide a buzz reduction circuit of low price which can reduce a vertical period buzz.

The present invention provides a buzz reduction circuit for reducing the vertical period buzz induced in an audio signal by the vertical magnetic leakage flux from a deflection coil of a television receiver. The buzz reduction circuit is applied to an audio signal, reproduced by a magnetic head. The buzz reduction circuit comprises a vertical synchronizing pulse forming means to produce a vertical synchronizing pulse from the video signal, which causes the vertical leakage magnetic flux, and a buzz reduction means to produce a vertical period buzz reduction signal, which is applied to the audio signal for the magnetic head at the pre-stage of the amplifier circuit.

The vertical synchronizing pulse forming means comprises a vertical synchronizing signal separating circuit to separate a vertical synchronizing signal, which is synchronized with a vertical synchronizing buzz, from a video signal and an integration circuit to produce a vertical synchronizing pulse from the separated vertical synchronizing signal. The buzz reduction means comprises a vertical period buzz reduction circuit to produce the vertical synchronizing buzz reduction signal by waveform shaping of the vertical synchronizing pulse and performing a level compensation so as to equal to the vertical synchronizing buzz.

The vertical synchronizing signal separating circuit separates the vertical synchronizing signal from an input video signal to extract the synchronizing signal synchronized with the vertical period buzz. The integration circuit produces the vertical synchronizing pulse by waveform shaping of the vertical synchronizing signal. The vertical period buzz reduction circuit performs a level compensation of a signal in accordance with the vertical synchronizing pulse so as to equal to the vertical period buzz. The vertical period buzz reduction circuit produces a vertical period buzz reduction signal whose phase is inverted. The vertical period buzz reduction signal is added to a pre-stage of an amplifier circuit in the audio output line so as to eliminate a vertical period buzz contained in an audio signal. After eliminating the vertical period buzz, the audio signal is amplified and output. Since the reduction of the vertical period buzz is performed prior to amplifying the audio signal, there is no influence caused by fluctuations of gains in amplifier circuits. Accordingly, there is no need to constitute a circuit for avoiding influences caused by fluctuations of gains in amplifier circuits. Consequently, the increase of cost can be suppressed to a minimum and the buzz reduction circuit obtained by the present invention can easily be incorporated into a TV/VCR combo.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
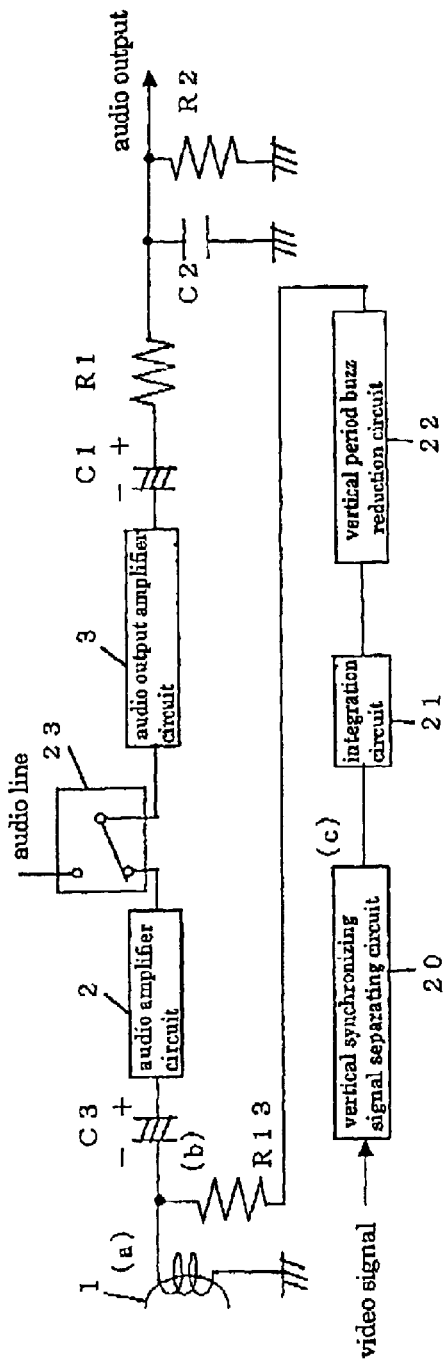
FIG. 1 is a block diagram showing an audio circuit incorporating one embodiment of a buzz reduction circuit according to the present invention.
Figure 2:
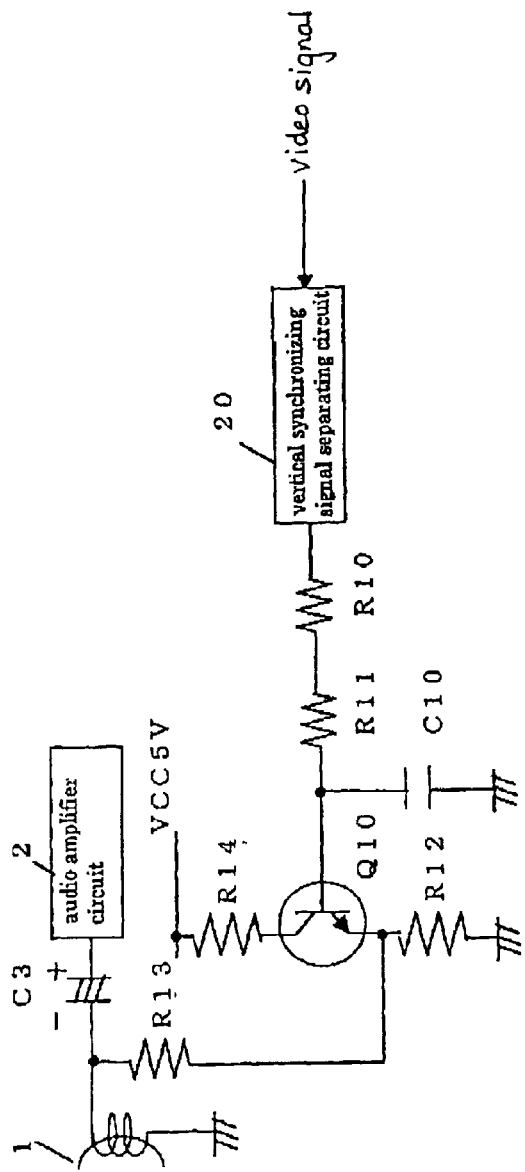
FIG. 2 is a detailed block diagram showing one embodiment of the buzz reduction circuit.

One embodiment of the buzz reduction circuit according to the present invention is shown in FIG. 1 and FIG. 2. The buzz reduction circuit is provided with a vertical synchronizing signal separating circuit 20, an integration circuit 21, and a vertical period buzz reduction circuit 22. An output stage of the vertical period buzz reduction circuit is connected to a pre-stage of an audio amplifier circuit 2 in an audio output line of a linear audio head 1 in order to produce a vertical period buzz reduction signal for reducing a vertical period buzz, and subsequently the produced vertical period buzz reduction signal is output to the audio output line.

Figure 5:
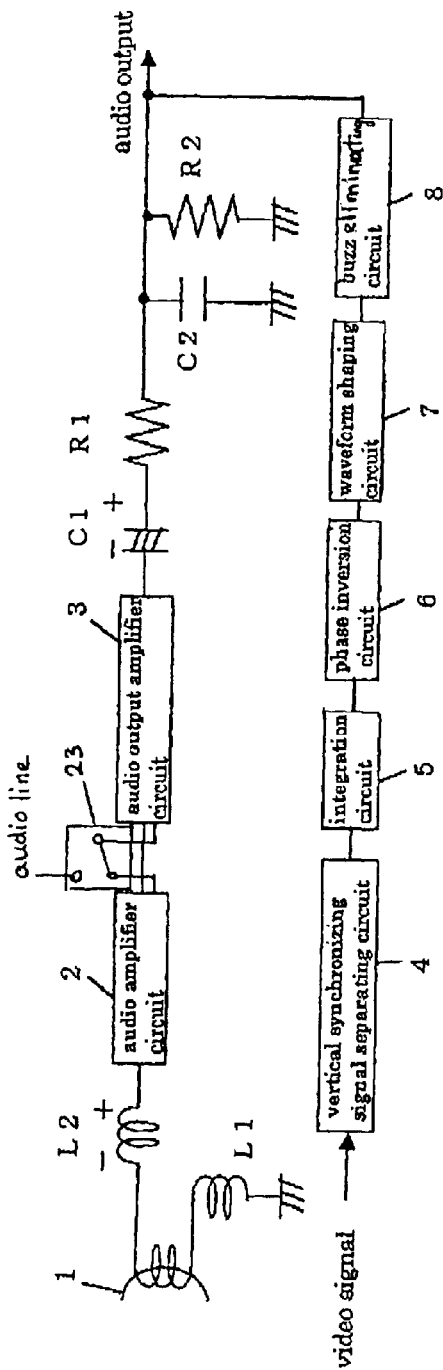
FIG. 5 is a block diagram showing a conventional buzz reduction circuit.
Figure 6:
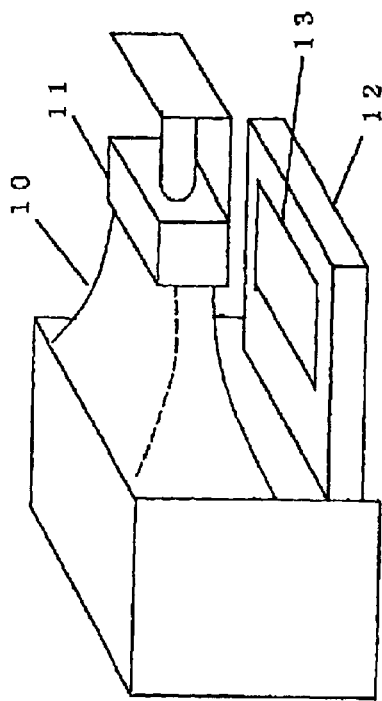
FIG. 6 is a drawing showing a TV/VCR combo provided with a conventional vertical period buzz reduction solution by utilizing a silicon steel plate.

The audio output line is substantially the same as the conventional art shown in FIG. 5. In FIG. 1, a numeral 23 is a switching circuit to switch a connection to outputs from other audio lines, and C3 is a capacitor to cut a DC component from a reproduction video signal.

The vertical synchronizing signal separating circuit 20 comprises a well-known chroma LSI to separate a vertical synchronizing signal from a video signal (a reproduction video signal). The integration circuit 21, comprising resistors R10, R11 and a capacitor C10; produces a vertical synchronizing pulse from a vertical synchronizing signal. The vertical period buzz reduction circuit 22 comprises a transistor Q10 and resistors R12, R13, wherein the emitter of the transistor Q10 is connected, via the resistor R13, between the linear audio head 1 and the capacitor C3 in the audio output line. The vertical period buzz reduction circuit 22 produces a vertical period buzz reduction signal from a vertical synchronizing pulse. The resistor R14 is a load resistance.

Figure 3:
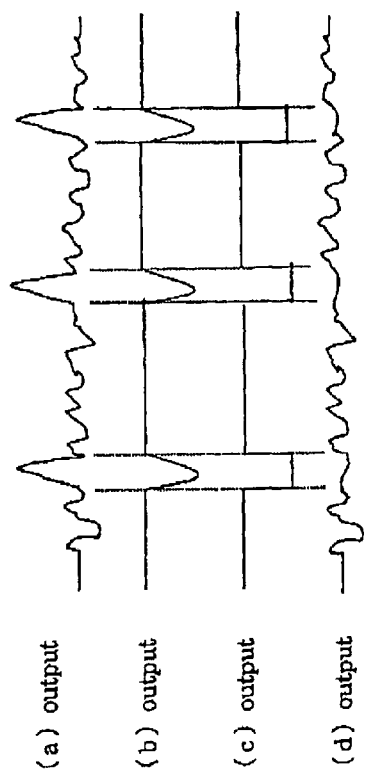
FIG. 3 is a drawing showing output waveforms in the buzz reduction circuit.

The reproduction video signal from a video head of a VCR is input to the vertical synchronizing signal separating circuit 20, that is synchronized, with a vertical period buzz leaked from a deflection coil. Then, a vertical synchronizing signal of an inverted phase, as shown in FIG. 3 (c), is output. The integral circuit 21 produces a vertical synchronizing pulse by converting a square wave to a pulse shape. Subsequently, in the vertical period buzz reduction circuit 22, a waveform shaping is performed by the transistor Q10 and a level compensation is performed by the resistors R12 and R13 so as to equal to the output level of the vertical synchronizing buzz. Thus, as shown in FIG. 3 (b), a vertical period buzz reduction signal is obtained, having an equal output level and an inverted phase in comparison with the vertical period buzz. The vertical period buzz reduction signal is applied to the reproduction audio signal from the linear audio head 1.

A vertical leakage magnetic flux from a deflection coil of a television receiver is picked up by the linear audio head 1 and generates a vertical period buzz. The vertical period buzz is mixed with the reproduction audio signal and a mixed signal is output as shown in FIG. 3 (a). By inputting the vertical period buzz reduction signal having an inverted phase (shown in FIG. 3 (b), a reproduction audio signal neutralizing a vertical period buzz is output, as shown in FIG. 3 (d). Then, the reproduction audio signal is amplified and output, while noises are eliminated.

Resistors R10, R11, and R13 having a very high resistance value are selected in accordance with the level of the vertical period buzz. The output level of the vertical period buzz reduction signal is small in comparison to the prior art, since the vertical buzz is not amplified by an audio amplifier circuit 2 and by an audio output amplifier circuit 3. As a result, less influence is caused by possible output fluctuations of the vertical period buzz reduction circuit 22 and the integration circuit 21, so that a reduction of the vertical period buzz can be performed without fail.

Further, by adding the vertical period buzz reduction signal to the pre-stage of the amplifier circuits 2 and 3 in the audio output line, no influence is caused by fluctuations of gain of amplifier circuits 2 and 3. Consequently, compared with a conventional technology, where a buzz reduction signal is added to a rear-stage of an amplifier circuit, the construction of the entire circuit becomes simplified.

Accordingly, possible fluctuations in the audio output line can be limited only to an L value of the deflection coil of a CRT. Namely, where the size of the CRT is changed, the magnetic flux level leaked from the deflection coil changes. In such a case, a level compensation of the vertical period buzz reduction signal is performed by changing the constant of the resistors R10, R11, R12, R13 and the capacitor C10.

Where a vertical period buzz reduction signal is input to the rear-stage of the amplifier circuit as shown in the prior art, a buzz reduction signal is constantly input to the audio output even when the TV/VCR combo is in operation mode other than a reproduction mode. Since the audio line of the switching circuit 23 is not affected by the magnetic leakage flux of the deflection coil, it is not necessary to provide buzz reduction when the TV/VCR combo is in operation mode other than reproduction mode. As a result, when a vertical period buzz reduction signal is added to an audio signal provided by the audio line, it causes a noise that deteriorates a S/N ratio and sounds unpleasant. Accordingly, in the prior art, an additional means such as a switch is necessary to shut off the buzz eliminating circuit when the TV/VCR combo is in operation mode other than reproduction mode. In the preferred embodiment, a buzz reduction circuit is applied upstream switching circuit 23. Accordingly, when the TV/VCR combo is in operation mode other than reproduction mode it is not necessary to provide a buzz reduction circuit.

Figure 4:
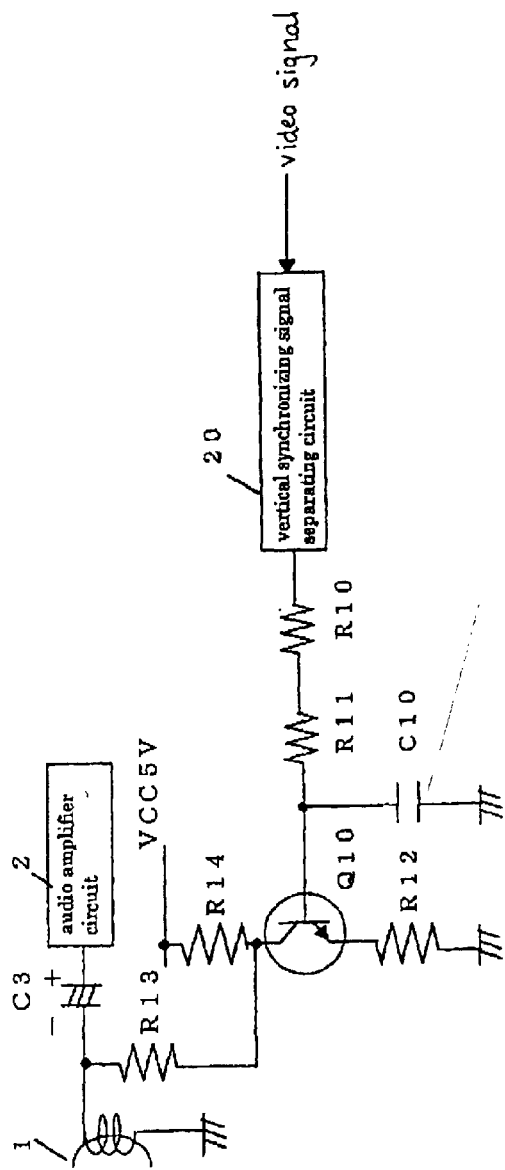
FIG. 4 is a detailed block diagram showing a second embodiment of the buzz reduction circuit.

The present invention is not limited to the above-described specific embodiments but is subject to various changes and modifications. For example, in case of a vertical period buzz of a reverse polarity compared with the polarity of the vertical period buzz explained above, a phase of a vertical period buzz reduction signal may be inverted. As shown in FIG. 4, a collector of the transistor Q10 in the vertical period buzz reduction circuit 22 is connected, via the resistor R13, between the linear audio head 1 and the capacitor C3 in an audio output line. Other constitution may be the same as above described. As an output of the transistor Q10 is inverted, a vertical period buzz reduction signal of a reverse polarity is obtained.

The buzz reduction circuit described heretofore can be applied not only to an audio signal of a VCR but also to an audio signal of a tape recorder. Accordingly, it is applicable to a TV/VCR combo and a tape recorder built-in television receiver. Furthermore, it is also effective to eliminate a buzz of a VCR set near a television receiver.

As apparent from the above described explanation, the present invention adopts such a constitution that a vertical period buzz reduction signal is input to a pre-stage of an amplifier circuit in an audio output line, so that a vertical period buzz reduction signal in response to a vertical period buzz can be produced regardless of fluctuations of amplifier circuits. Accordingly, there is no need to take fluctuations of amplifier circuits into consideration, so that a vertical period buzz can be reduced without fail by a simplified circuitry producing a vertical period buzz reduction signal in accordance with a vertical synchronizing pulse produced from a video signal. Furthermore, there is no need to use a silicon steel plate to shield a magnetic leakage flux of a deflection coil of a television receiver, so that a VCR manufacturing cost can be suppressed.

Furthermore, a reduction of a vertical period buzz is performed prior to amplifying the audio signal, so that an output level of a vertical period buzz reduction signal can be decreased. Accordingly, there are little influences caused by fluctuations of output of a buzz reduction circuit, and thereby a certainty of the buzz reduction performance is enhanced.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A buzz reduction circuit comprising:
a vertical synchronizing pulse forming means to produce a vertical synchronizing pulse from a video signal; and
a buzz reduction means to produce a vertical period buzz reduction signal from the vertical synchronizing pulse, wherein the vertical period buzz reduction signal is applied to an audio signal being reproduced by a magnetic head prior to amplification of the audio signal.

2. The buzz reduction circuit according to claim 1, wherein said vertical synchronizing pulse forming means further comprises a vertical synchronizing signal separating circuit and an integration circuit; and
wherein said buzz reduction means further comprises a vertical synchronizing buzz reduction circuit.

3. The buzz reduction circuit according to claim 1, wherein said vertical synchronizing pulse forming means further comprises
a means for separating a vertical synchronizing signal from a video signal, and
a means for producing said vertical synchronizing pulse from the separated vertical synchronizing signal; and
wherein said buzz reduction means further comprises
a means for shaping the vertical synchronizing pulse, and
a means for setting the magnitude of the vertical synchronizing pulse to substantially equal a vertical synchronizing buzz.

4. The buzz reduction circuit according to claim 1, wherein said video signal is a reproduction video signal.

5. The buzz reduction circuit according to claim 2, wherein said video signal is a reproduction video signal.

6. The buzz reduction circuit according to claim 3, wherein said video signal is a reproduction video signal.

7. A TV/VCR combo having a buzz reduction circuit, said buzz reduction circuit comprising:
a vertical synchronizing pulse forming means to produce a vertical synchronizing pulse from a video signal; and
a buzz reduction means to produce a vertical period buzz reduction signal from the vertical synchronizing pulse, wherein the vertical period buzz reduction signal is applied to an audio signal being reproduced by a magnetic head prior to amplification of the audio signal.

8. A TV/VCR combo according to claim 7, wherein said vertical synchronizing pulse forming means further comprises a vertical synchronizing signal separating circuit and an integration circuit; and
wherein said buzz reduction means further comprises a vertical synchronizing buzz reduction circuit.

9. A TV/VCR combo having a buzz reduction circuit, said buzz reduction circuit comprising:
a vertical synchronizing pulse forming means further comprising:
a means for separating a vertical synchronizing signal from a video signal; and
a means for producing the vertical synchronizing pulse from the separated vertical synchronizing signal; and
a buzz reduction means further comprising:
a means for shaping the vertical synchronizing pulse; and
a means for setting the magnitude of the vertical synchronizing pulse to substantially equal a vertical synchronizing buzz.

10. A TV/VCR combo comprising the buzz reduction circuit according to claim 9, wherein said video signal is a reproduction video signal.

* * * * *